Figure 1:
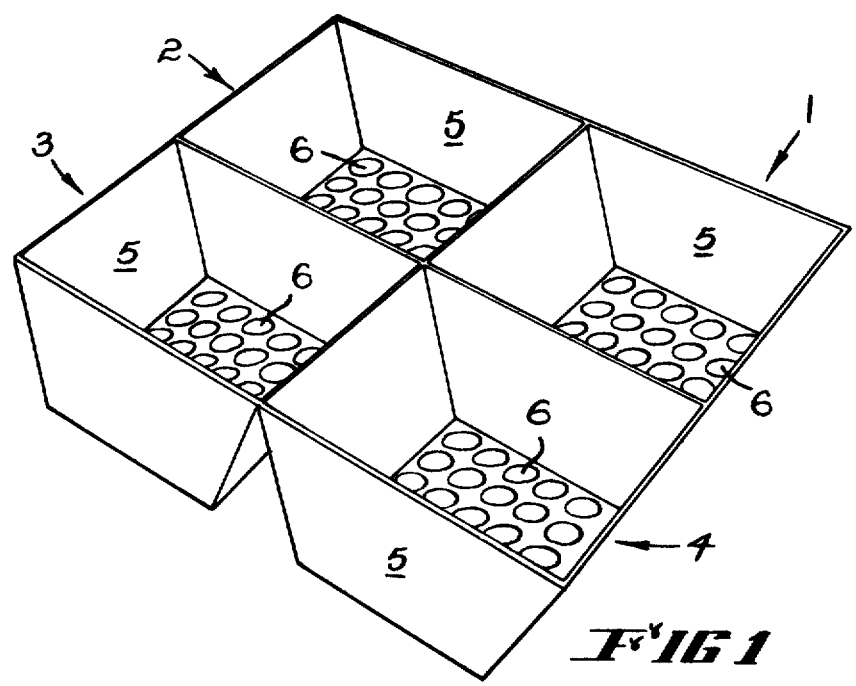

United States Patent

McAllister

[15] 3,675,191
[45] July 4, 1972

[54] ACOUSTIC SOUNDER

[72] Inventor: Lindsay G. McAllister, Elizabeth South, South Australia, Australia

[73] Assignee: The Commonwealth of Australia Care of The Secretary Department of Supply, Parkes, Canberra, Australia

[22] Filed: Dec. 29, 1969

[21] Appl. No.: 888,284

[52] U.S. Cl. .......................... 340/1 R, 73/170 R, 340/5 S
[51] Int. Cl. ................................................ G01s 9/66
[58] Field of Search .................... 340/1, 3, 5 S, 3 D, 16; 73/170 R; 343/5 W

[56] References Cited

UNITED STATES PATENTS

| | | | |
|---|---|---|---|
| 2,507,121 | 5/1950 | Sivian | 340/16 |
| 3,379,060 | 4/1968 | Pear, Jr. | 340/5 S |
| 2,928,277 | 3/1960 | Cavanagh et al. | 73/170 |
| 3,491,333 | 1/1970 | Goulet et al. | 340/3 |

*Primary Examiner*—Richard A. Farley
*Attorney*—Waters, Roditi, Schwartz & Nissen

[57] ABSTRACT

A method of recording upper atmospheric characteristics which comprises transmitting in a generally upward direction recurrent pulses of acoustic energy at a selected frequency band of operation at a repetition interval longer than that required to receive back a reflected signal from a target, receiving the back-scattered energy on a facsimile recorder or other indicating mechanism which records the time and/or intensity and/or duration and/or direction of the backscattered energy to permit upper atmospheric characteristics to be determined at airports or other localities where such information is of vital importance, the apparatus including a transducer to radiate the pulses of acoustic energy and to receive the backscattered energy and to record from it the required data.

8 Claims, 7 Drawing Figures

Patented July 4, 1972

3,675,191

6 Sheets-Sheet 1

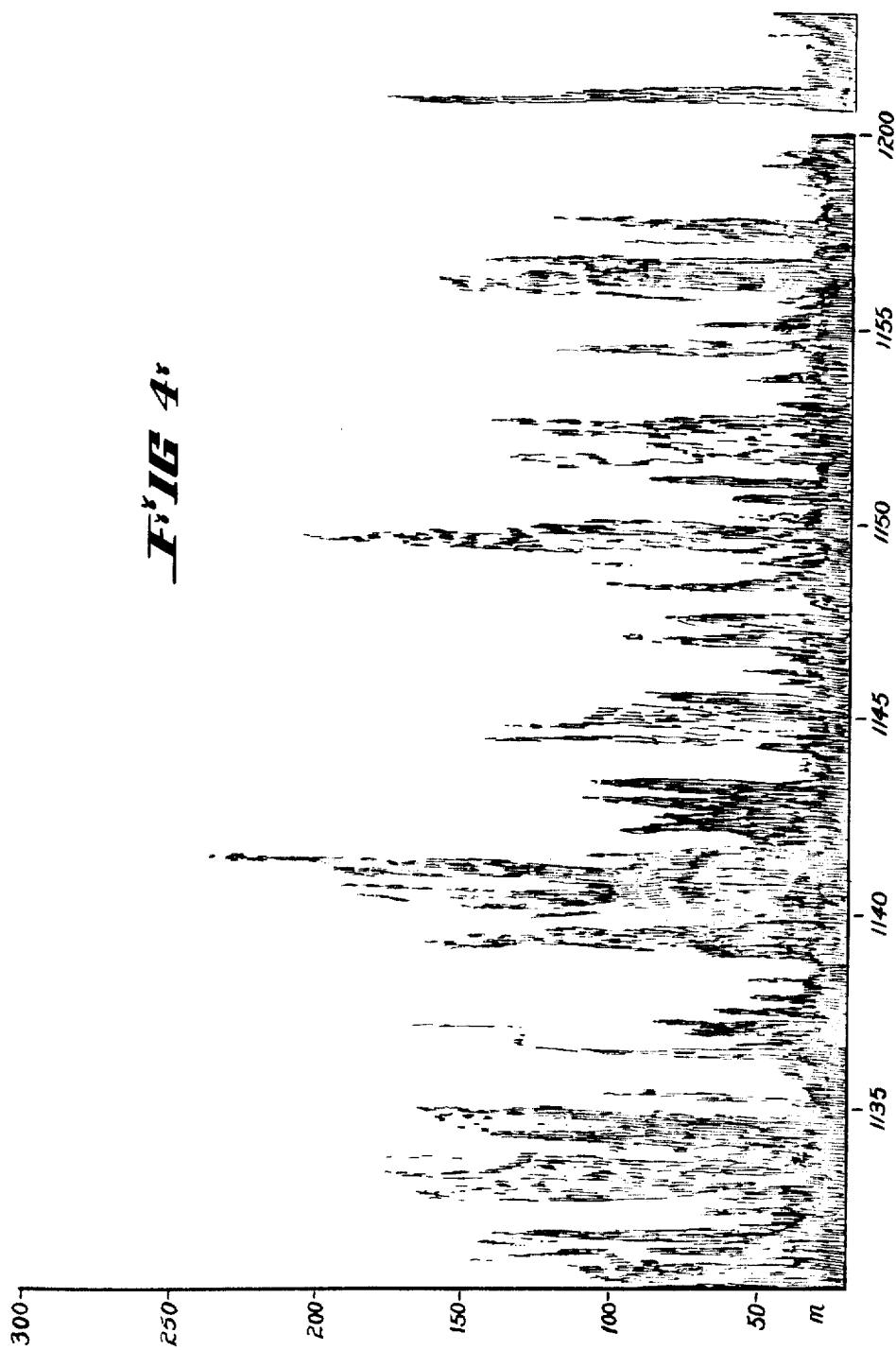

ACOUSTIC SOUNDER

This invention relates to an acoustic sounder which has been designed to record the characteristics of turbulent air in the troposphere.

This invention has particular reference to a method of and means for determining upper atmospheric conditions, particularly in the troposphere, and comprises projecting vertically, or near vertical sound impulses or frequency bands into the air to be investigated, and recording the backscatter of the signals in graphical or tabular form to show the conditions existing. Such a system can be used to study interaction of sound and atmosphere and allows the presence of "targets" to be determined.

According to the method and means now proposed a continuous determination is possible if such is required, and the invention does not suffer from the defects which exist when radio sonde methods are used which give but infrequent data.

The application of the invention is relatively wide and because of the ability of the sounder to detect turbulence and to define the height range over which it exists, the invention can lead to applications in the landing of aircraft, the determination of the depth of fog, diffusion of pollutants, in the atmosphere, and in general atmospheric research.

According to its preferred form the acoustic sounder is an instrument designed to record the characteristics on facsimile paper or other recording media in the form, height versus time of day, and this allows a direct reading at any time of the height and thickness of the turbulent regions and the movement of these regions during the course of the day.

The invention can be carried into effect in various ways but according to one form short pulses of acoustic energy at a selected frequency or multiple frequency bands are directed upward, vertically or angularly, from a high gain acoustic antenna at a pulse repetition rate selected for the purpose.

We have found for instance that using 950 Hz at a pulse repetition of 0.5 pulses per second and a peak pulse power of 100 watts, good readings are obtainable because some of the acoustic energy incident on the turbulent air is backscattered and this energy can then be received on an acoustic array, amplified and recorded on the facsimile recorder as density modulation of the paper. The record can be a height versus time of day record of turbulent regions of the lower atmosphere, and as earlier stated this allows effective collection of data on a continuous basis which is available immediately so that it can be disseminated as required at any particular time interval.

In one actual experiment short pulses of 50 ms. of acoustic energy were used at a carrier frequency of 900 Hz and repeated every 10 seconds, and these were beamed upward from an array, the array being switched from the transmit to the receive mode of operation by electromagnetic relays.

Instead of using a single switched array it is possible for instance to use a multiplicity of these arrays and to use one or all as the sound propagating means and to analyze this backscattered signal independently at each array or in groups.

Using apparatus of this general type many diverse structures have been recorded by a sounder up to 5,500 feet, which have been associated with the passage of cold fronts, sea and land breeze circulations, hill wind systems, and radio inversions and daytime thermal plumes.

It has been concluded on theoretical and experimental grounds, that the acoustic energy is backscattered from random fluctuations in temperature (of the order of 0.1° C.) arising from turbulence in the atmosphere. By using these localized regions of turbulence as tracer targets, it was possible to deduce the motion of the surrounding, non-turbulent air when the structure was relatively simple.

The ability of the sounder to detect turbulence and to define the height range over which it exists, can, as stated earlier, lead to applications in the landing of aircraft, the determination of the depth of fog and the like, and while so far the research has been directed to the lower levels of up to 5,500 feet, initial studies based on the results of current work show that by using a frequency of 200 Hz and a 50 foot concrete parabola as the aerial system, it would be possible to detect clear air turbulence up to perhaps 40,000 feet.

As no satisfactory remote sensing technique has yet been developed to detect clear air turbulence at these heights, the invention forms an important advance in this particular art.

The invention also envisages methods of using the sounder to measure the mean wind speed and direction, this being achieved by recording the time taken for the pattern of turbulence to drift across the antennae. This will be a function of the wind speed and direction at the height of the "target" turbulence.

Further information is given by noting the angle of arrival of backscattered energy. Since the sound energy travels relative to the moving air stream, the returning energy will drift downstream with the wind. The angle of arrival will thus be a measure of the wind speed and direction. The ability to measure the mean wind speed and direction remotely, from the simple ground based equipment would lead to applications in airport control, operational meteorology, gun laying and ranging, diffusion of gas pollutants and the like.

The sensitivity of the system can be improved by taking advantage of electromagnetic radar techniques. Additional parameters can be extracted by departing from the present vertically directed system, and such a system will be described with an oblique mode, via spectral shifts to give data on turbulence and spectral spread.

Figure 3:
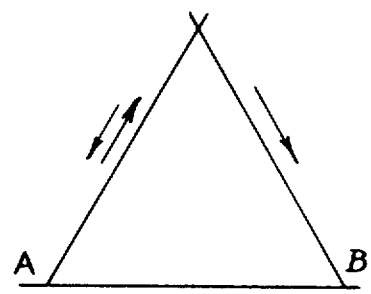
Figure 2:
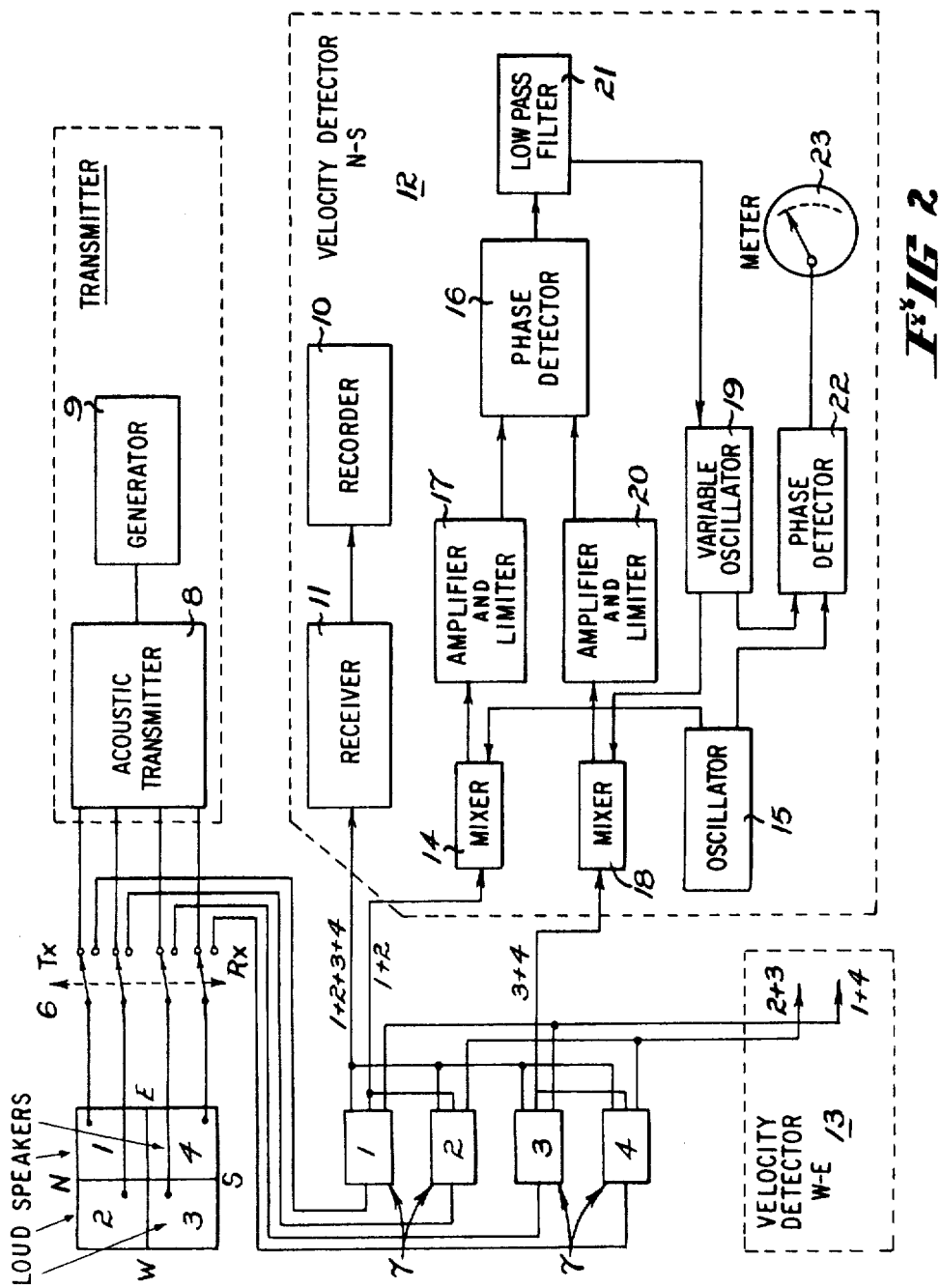
Figure 5:
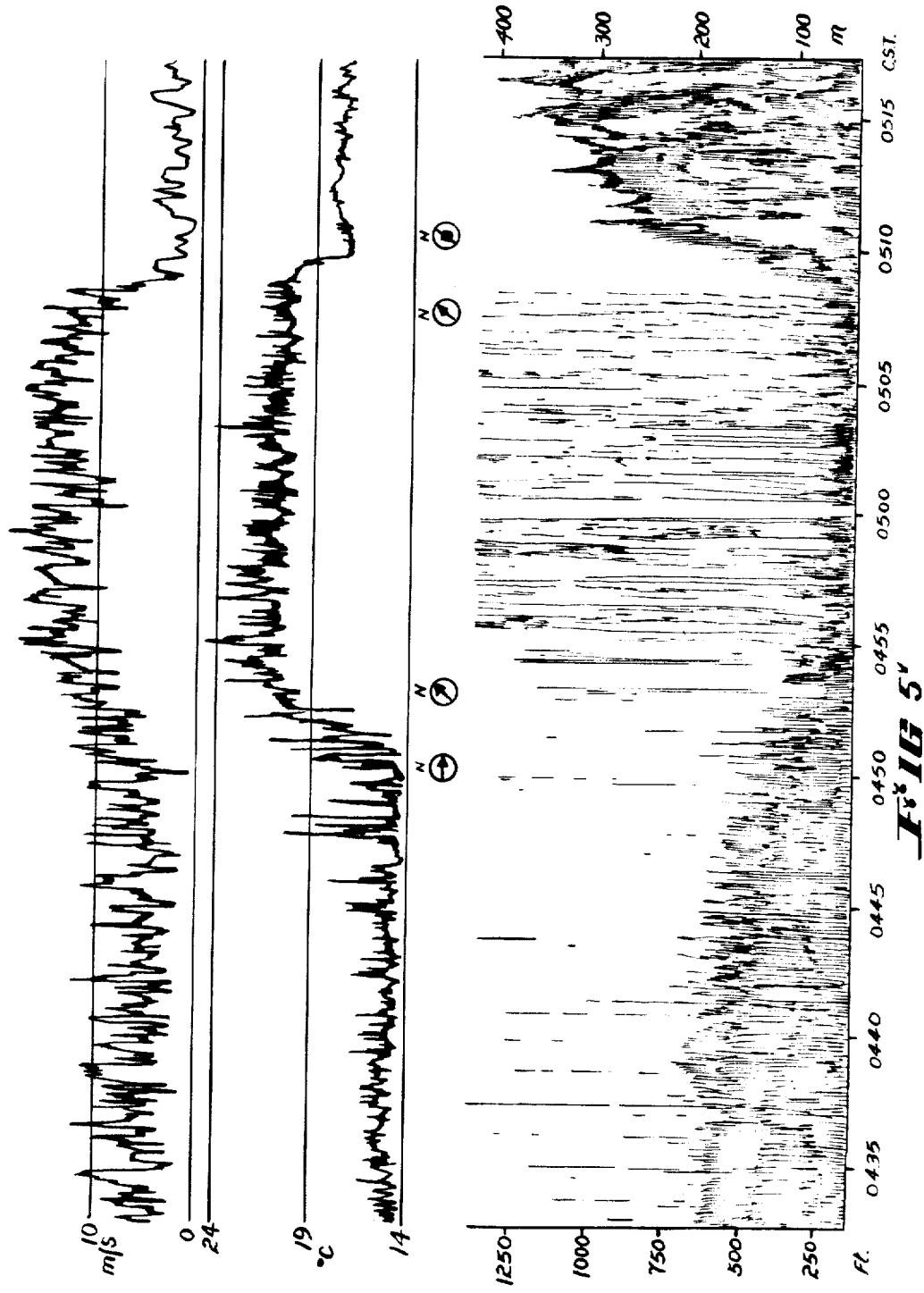
Figure 6:
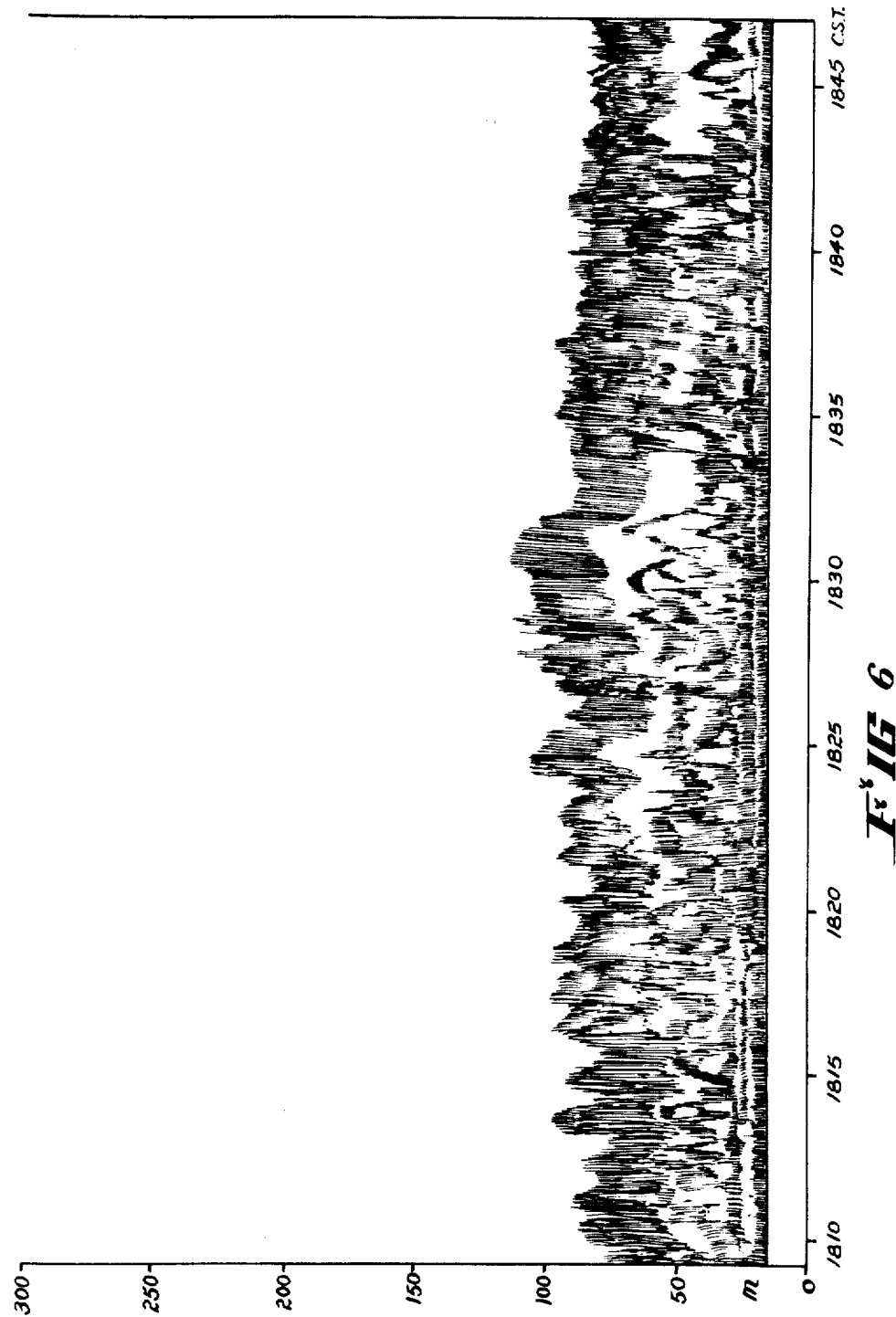
Figure 7:
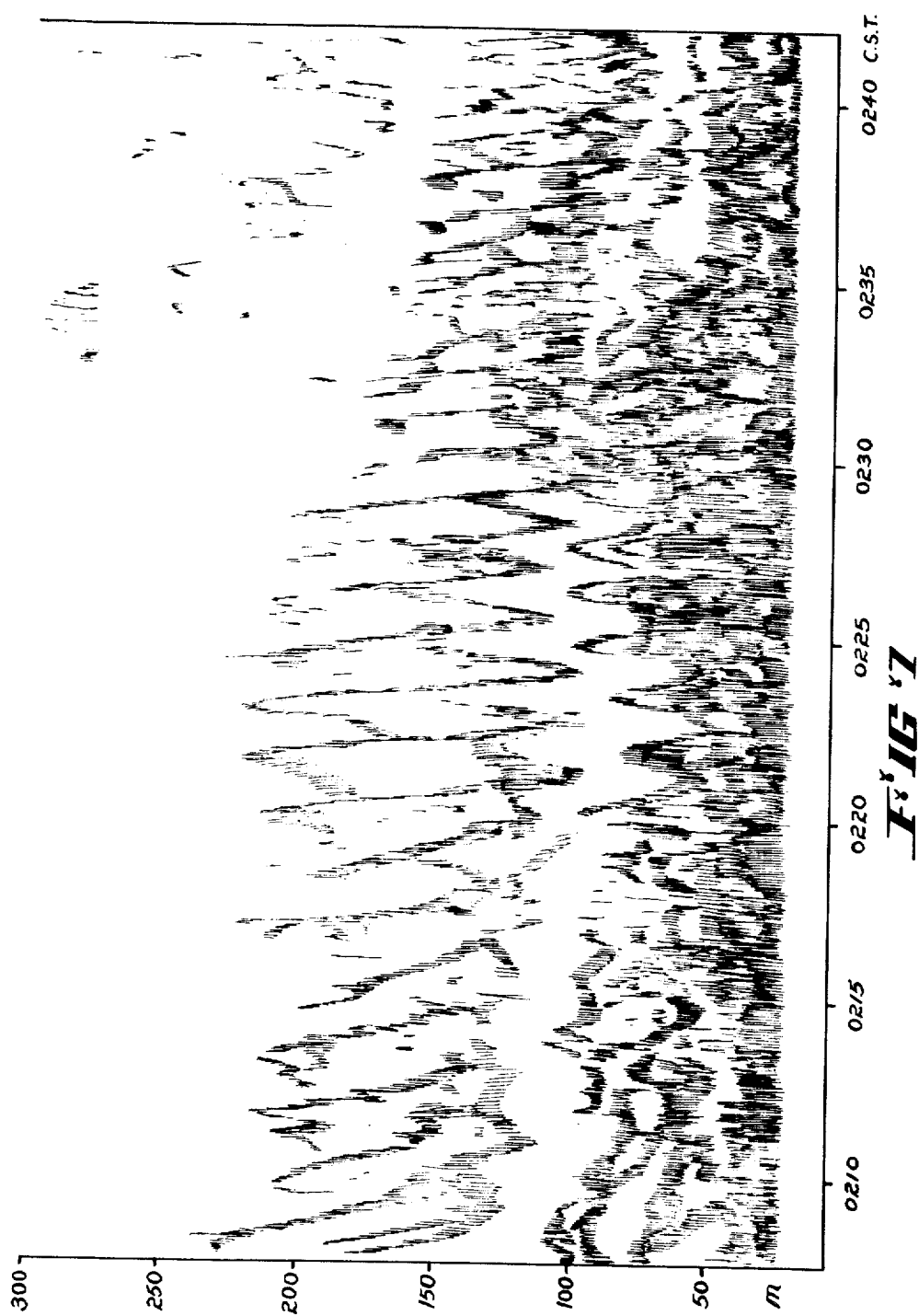

In order however that the invention will be fully understood, embodiments will now be described with reference to the accompanying drawings in which:

FIG. 1 shows a transmitting and receiving acoustic array using four groups of speakers with side shields to limit ground scatter, this array being alternately fed with a signal and then switched to receive mode, FIG. 2 shows schematically how the system can record height, velocity and direction using such an array, FIG. 3 shows schematically the operation of the device with spaced transducers, FIG. 4 shows an acoustic sounding record of thermal plumes observed during one experiment, FIG. 5 is a record obtained during the passage of a cold front, showing also a wind and temperature trace, FIG. 6 shows an advection of continental air across the sea, and FIG. 7 shows a record of breaking waves in a radiation inversion.

Referring first to FIGS. 1 and 2. A number of speakers are arranged on a horizontal or near horizontal surface, the speakers being arranged in four arrays 1, 2, 3 and 4 to direct a strong impulse signal upwards at intervals. Wooden or other walls 5, which slope upward and outward, form boxes which serve to reduce ground reflection. The generated signal can be applied to all speakers of the arrays and received by all speakers, although variation of this pattern is possible particularly where wind direction is to be determined.

In this specification the expression "speakers" includes any device which can translate electrical energy to physical movement.

In experimental work an array of 196 eight inch commercial loudspeakers 6 was used in the boxes, these giving a peak pulse power of 500 watts. Thin plastic sheets were spread across the loudspeakers for weather protection.

Instead of a single transmitted frequency, bands of frequencies can be used such as the multifrequency "chirp" used in radar techniques.

Such a system can be used simply as an acoustic radar which records height of a target such as a temperature inversion, but much more data can be obtained by the system as is indicated with special reference to FIG. 2 where measurement of mean wind velocity and direction using angle of arrival techniques is used.

In this system energy directed upwards and backscattered from turbulence towards the origin, arrives back at an angle to the vertical which is a function of the mean wind velocity up to the region of the turbulence. This small angle can be measured in the following receivers to yield a parameter which is a function of the mean wind velocity. Using four arrays 1, 2, 3 and 4 as shown in FIG. 1, all four are first used in the transmit mode, a relay group 6 (see FIG. 2) being used to switch from Tx to Rx mode. In the Rx mode, each one of the four arrays 1, 2, 3 and 4 are fed to separate multicouplers 7, each of which has three outputs as shown in FIG. 2.

In the Tx mode the speakers are energized by an acoustic transmitter 8 timed by a generator 9.

In the Rx mode the outputs are combined as follows 1+2+3+π¼; 1+2, 3+4; 2+3 and 1+4.

Amplitude information (structure and height of turbulence etc.) is obtained by combining 1+2+3+4 and recording on a facsimile recorder 10 through an acoustic receiver 11 in the normal way to monitor the atmosphere being measured.

The time delay or phase difference between outputs 1+2 and 3+4 is a function of the N-S component of the wind and is measured in the N-S velocity detector 12. Similarly, outputs 2+3 and 1+4 are measured in the W-E velocity detector 13 to obtain the W-E component of the wind velocity.

To achieve this the output 1+2 is fed to a mixer 14 and frequency changed by the fixed oscillator 15. The intermediate frequency is passed to a phase detector 16 through an amplifier and limiter 17.

Output 3+4 is fed to a mixer 18 and frequency changed by the variable frequency oscillator 19. The output from this mixer 18 is passed to the phase detector 29 through the amplifier and limiter 20. The output form the phase detector 16 is filtered by a low pass filter 21 and used to control the frequency of oscillator 19. If the two inputs 1+2 and 3+4 are in phase (zero wind) the output from 16 will be zero and the frequency and phase of the oscillators 15 and 19 will be identical. If not zero, the phase difference will appear in the phase difference between 15 and 19, and this phase, a measure of the mean wind velocity, is measured in the linear phase detector 22 and read on meter 23 or some similar anologue recorder.

A similar system is included in the W-E velocity detector 13, thereby allowing a compound wind reading to be obtained from which direction can be calculated.

The system could of course be arranged at an angle other than vertical and FIG. 3 shows diagramatically how a pair of transducers A and B spaced apart and at an angle to the vertical can be used, in which case a signal generated at A can be measured on return both at A and at B. In this way conventional doppler techniques can be used to determine radial wind velocity.

Examples of the results obtained by the general systems outlined in the foregoing descriptions will now be referred to. These are shown in FIGS. 4 to 7.

EXAMPLE 1, FIG. 4.

This demonstrates the readings obtained when thermal plumes are present in the atmosphere.

In this case there was a fairly uniform distribution of returns within the column of the plume and the columns of echoes were strong and broad at the base but weakened and tended to taper to the vanishing point at the top. They extended up to the full range of the instrument (300 meters) and were surrounded by areas of weak or undetectable echoes. The duration of the plumes was variable and in the range of 10 seconds to two minutes which, in the prevailing wind, suggested a horizontal dimension of 70 to 840 meters. Plumes were observed during the day from 1100 to 1500 CST, reaching a maximum rate of occurrence of 30 to 40 per hour during the hottest part of the day and rapidly disappearing as the ground temperature began to decline towards evening.

The pattern suggests that the strong echoes were due to scattering from small-scale temperature fluctuations generated by thermal convection within the core or superadiabatic region of the plume.

EXAMPLE 2, FIG. 5.

This shows the results obtained from an experiment conducted on the extreme south west tip of Kangaroo Island, South Australia, to study the temperature structure in an ocean environment when warm, dry easterly air was flowing across the sea from the continent. The site was on a narrow peninsular which jutted out into the sea with cliffs 50 - 60 meters high and was a very close approximation to an ocean environment. An anemometer, wind vane and temperature sensing element were mounted at a height of eight meters above the surface.

On the December 8, 1968, the center of the high pressure area was over Tasmania and west to north-east winds were blowing towards the island from the continent. A low pressure trough was located to the west in the Great Australian Bight and moving towards the island.

The sounding record shown was obtained prior to, and immediately following the passage of the leading edge of the front. The record can be divided into three time sections, viz 0435 - 0455 CST, 0455 - 0508, and 0508 - 0515

In the first period, the surface wind was from the east and gusting between two and 12 m/s. The mean temperature at the eight m level was 16° C. fluctuating between 15° C. and 20° C. The character of the temperature trace was very spiky suggesting bursts of warm air were being injected into the cool surface air from above.

From 0455 - 0508, the mean wind velocity increased and the wind shifted from the east to the north-east. The temperature rose very rapidly and the trace continued to be spiky in character. The sounding record showed that the depth of turbulent mixing decreased from 200 m to about 50 m during this time. The vertical streaks on the record were caused by mechanical vibrations in the aerial during severe wind gusts. The following interpretation may be placed on the sounding record up to 0508 CST. From 0435 - 0455 CST, the lower 200 meters of the air being advected across the sea from the continent was cooled from below by turbulent mixing. The depth of this mixing is shown clearly on the sounding record as backscatter from the temperature fluctuations within the turbulent air. The gustiness of the wind and the spikiness of the temperature record suggest that air from the 200 meter level was injected down to the surface against bouyancy forces. By 0455 CST, the cool surface air was completely eroded away and the characteristics of the warm over-riding air were evident at the surface.

The leading edge of the front passes the site at 0508 CST, when the wind velocity dropped markedly and changed around to the south west, the temperature dropped rapidly (though still above the sea temperature of 14° C. and showed only small fluctuations. The pressure increased rapidly by 0.03 inches. The increase in height of the air mass boundary is shown on the sounding record as an inclined band of returns arising from the turbulent mixing across the boundary. Note the relatively clear region beneath the boundary in contrast to the filled in region below 200 meters from 0435 - 0450 CST.

EXAMPLE 3, FIG. 6.

On the December 11, 1968, the wind at the above area was blowing from the north east at eight knots from the mainland. Under these conditions, the air had a long fetch over the continent and considerable warming occurred. The surface temperature at a Cape at this locality was 18° C. and only moderate fluctuations of the order of 0.5° C. were recorded. Similarly, only slight variations in wind speed were recorded. The high pressure region was centered over Tasmania and the pressure was steady when the record shown in FIG. 7 was obtained. The region above 120 meters was clear of acoustic returns which suggested near laminar flow at this height. The well defined upper limit of turbulent mixing (top of temperature inversion) is seen and there is also a well defined lower limit to the zone of vigorous mixing between the lower maritime air mass and the upper continental air mass. The returns within the maritime air mass probably resulted from upward mixing of cold air from the sea surface. The clear regions immediately below the temperature inversion will be noted. This suggests that the flow of air at this point was directed upwards towards the inversion. The sinusoidal motion of the inversion surface is well defined between 1813 and 1826 CST.

EXAMPLE 4, FIG. 7.

The record shown in this figure was obtained during the winter on the April 29, 1969 when a strong radiation inversion had developed overnight at Salisbury South Australia. The maximum temperature on the previous day reach 24° C. and the minimum temperature of 9° C. was recorded at 0400/29/4/69. Dew point was reached at 0200/29/4/69. At 0200/29/4/69, the wind at the 10 meter level was very light (one m/s) from the north. During the previous day there was a light north to north-west wind blowing. The acoustic sounder was sited in an open, flat field and the nearest trees, buildings, etc., were 500 m away. The most significant features of this record are the breaking gravity waves seen in the height range 100 to 230 m at 0225 CST. While this is a particularly good example of the breaking wave structure, the characteristic herringbone line (line of negative slope), the curved crest of the wave, the V-shaped intersection of the herringbone line and the line of positive slope, and the relatively clear area beneath the crest of the wave can be identified in many records under conditions of light wind and stable temperature profile.

From the foregoing it will be realized that the invention envisages a material improvement in the determination of conditions in the troposphere, the information resulting from the use of acoustical sounding making the invention suitable for use in a number of fields including those arts where air conditions, the presence of fog, and the like is of importance.

What I claim is:

1. The method of recording turbulent air in the troposphere which comprises transmitting form a plurality of acoustic energy arrays, in a generally upward direction, recurrent pulses of acoustic energy at a selected frequency band of operation and at a repetition interval longer than that required to receive back-scattered energy from a target, receiving the back-scattered energy, and selectively recording time of arrival, intensity, and direction of the returning back-scattered energy, said plurality of acoustic energy arrays being alternately switched from a transmit mode to a receive mode and the output signals of the arrays in the receive mode being at least in part independently analyzed to determine characteristics of the target.

2. The method of claim 1 comprising plotting the backscattered energy in a time of day amplitude relationship on a facsimile recorder to give an acoustic radar plot indicating height of the target turbulence in relation to time of day.

3. The method of claim 1 comprising recording the angle of arrival of the backscattered from in relation to the transmitter to indicate wind speed and direction.

4. The method of claim 1 wherein the plurality of acoustical energy arrays which are alternately switched from a transmit mode to a receive mode are collectively energized in the transmit mode and the output signals of the arrays in the receive mode are collectively fed to an amplitude recorder but the output signals of group arrays are independently analyzed to indicate wind speed and direction.

5. The method of claim 1 wherein the recurrent pulses of acoustic energy have a frequency of about 950 Hz at a pulse repetition rate of about 0.5 pulses per second.

6. Apparatus for recording turbulent air in the troposphere inclusive of inversion layers and wind velocities and direction, said apparatus comprising transducer means for radiating pulses of acoustic energy at a selected frequency band of operation and at a repetition interval longer than that required to receive backscattered energy, and means to record the backscattered energy, said transducer means comprising an array of speakers directed towards the target area, and means for alternatively switching the speakers with a delay therebetween to a transmit mode and a receive mode so that acoustic energy is transmitted into the troposphere and backscattered energy is received by the said array, a plurality of said arrays being connected to be collectively energized in the transmit mode but selectively connected to indicator means in the receive mode so that target shift as well as distance and backscatter intensity is recorded.

7. Apparatus as claimed in claim 6 wherein said arrays of speakers are arranged in columns and rows, the switching means comprising separate multicoupler means connected to the outputs of each array for connecting the same to produce a number of output signals inclusive of one representing the sum of the outputs of all arrays, and others representing the sum of the output signals in the arrays in each row and column, phase detector means for determining phase difference between the output signals of the arrays in the rows and for determining phase difference between the output signals of the arrays in columns, said indicator means including indicators coupled to the phase detector means for indicating wind velocity in two directions as a function of the phase differences between the output signals in the arrays respectively in columns and rows.

8. Apparatus for recording turbulent air in the troposphere inclusive of inversion layers and wind velocities and direction, said apparatus comprising transducer means for radiating pulses of acoustic energy at a selected frequency band of operation and at a repetition interval longer than that required to receive backscattered energy, and means to record the backscattered energy, said transducer means comprising an array of speakers directed towards the target area, and means for alternatively switching the speakers with a delay therebetween to a transmit mode and a receive mode so that acoustic energy is transmitted into the troposphere and backscattered energy is received by the said array, a plurality of said arrays being spaced and angled relative to one another to operate at angles to record doppler shift.

* * * * *